United States Patent
Oh

(10) Patent No.: US 12,233,995 B2
(45) Date of Patent: Feb. 25, 2025

(54) LOAD AREA TRACKING TYPE SHIP BATTERY MANAGEMENT SYSTEM

(71) Applicant: KOREA MARITIME UNIVERSITY INDUSTRY-ACADEMIC COOPERATION FOUNDATION, Busan (KR)

(72) Inventor: Jin Seok Oh, Busan (KR)

(73) Assignee: KOREA MARITIME UNIVERSITY INDUSTRY—ACADEMIC COOPERATION FOUNDATION, Busan (KR)

( * ) Notice: Subject to any disclaimer, the term of this patent is extended or adjusted under 35 U.S.C. 154(b) by 292 days.

(21) Appl. No.: 17/956,782

(22) Filed: Sep. 29, 2022

(65) Prior Publication Data
US 2023/0166819 A1 Jun. 1, 2023

(30) Foreign Application Priority Data

Nov. 30, 2021 (KR) .......................... 10-2021-0169608

(51) Int. Cl.
*B63B 79/40* (2020.01)
*H01M 10/42* (2006.01)
(Continued)

(52) U.S. Cl.
CPC ........... *B63B 79/40* (2020.01); *H01M 10/425* (2013.01); *H01M 10/44* (2013.01); *H01M 10/48* (2013.01);
(Continued)

(58) Field of Classification Search
CPC .... H01M 10/425; H01M 10/44; H01M 10/48; H01M 2010/4271; H01M 2220/20;
(Continued)

(56) References Cited

U.S. PATENT DOCUMENTS

2018/0159330 A1* 6/2018 Kang .................... H02J 3/38

FOREIGN PATENT DOCUMENTS

| KR | 1020180017568 | | 2/2018 | |
| KR | 2023055513 | A * | 4/2023 | |
| WO | WO-2018101564 | A1 * | 6/2018 | ................ B63J 3/00 |

OTHER PUBLICATIONS

KR20230055513A—translation (Year: 2023).*
WO 2018101564A1—translation (Year: 2018).*

* cited by examiner

*Primary Examiner* — Abby Y Lin
*Assistant Examiner* — Renee LaRose
(74) *Attorney, Agent, or Firm* — JCIPRNET

(57) ABSTRACT

A load area tracking type ship battery management system is proposed. The ship battery management system includes a calculation unit for generating SFOC curve data periodically by calculating specific fuel oil consumption (SFOC) versus ship load factors, a LF setting unit for specifying a ship load factor point as a light load factor (LF) point in the SFOC curve data, a HF setting unit for specifying a ship load factor point as a heavy load factor (HF) point, a Emax setting unit configured to obtain a highest point (Emax) of generator efficiency, a Rmin setting unit for calculating battery charging efficiency in the LF to obtain a smallest load factor point (Rmin) bearing a generator load by battery charging, and a Rmax setting unit for calculating battery charging efficiency in the HF to obtain a highest load factor point (Rmax) bearing the generator load by battery discharging.

9 Claims, 10 Drawing Sheets

(51) Int. Cl.
  *H01M 10/44* (2006.01)
  *H01M 10/48* (2006.01)
  *H02J 7/00* (2006.01)

(52) U.S. Cl.
  CPC ... *H02J 7/0048* (2020.01); *H01M 2010/4271* (2013.01); *H01M 2220/20* (2013.01)

(58) Field of Classification Search
  CPC .. H02J 7/0048; H02J 2310/42; H02J 7/00712; B63B 79/40; B63J 3/04; B63J 2003/002
  See application file for complete search history.

LOAD AREA TRACKING TYPE SHIP BATTERY MANAGEMENT SYSTEM

CROSS REFERENCE TO RELATED APPLICATION

The present application claims priority to Korean Patent Application No. 10-2021-0169608, filed Nov. 30, 2021, the entire contents of which is incorporated herein for all purposes by this reference.

BACKGROUND OF THE INVENTION

Field of the Invention

The present disclosure relates to a load area tracking type ship battery management system and, more particularly, to a load area tracking type ship battery management system that is configured to calculate fuel consumption versus ship load factors represented by a combination of current ship generators, so that each ship load factor is tracked in SFOC curve data, thereby operating a ship in a Rmin to Rmax range, which is a section in which a fuel consumption rate of the ship is optimized.

Description of the Related Art

Conventionally, mechanical propulsion ships are designed to use an onboard generator as a main power source, and when a capacity of the generator is designed, the capacity is set to be larger than a load factor during actual operation by allowing a margin for the load factor. That is, the control and management of electric power should be able to performed efficiently by using the margin for the load factor.

In addition, due to strengthening of IMO environmental regulations, operation of an eco-friendly ship should be satisfied through applying a hybrid power generation system using new and renewable energy and the like in order to cope with the restriction of exhaust gases, which are environmental pollutants generated from conventional fossil fuel-based internal combustion engines.

As a technology for such an eco-friendly ship, "HYBRID GENERATION AND PROPULSION SYSTEM AND METHOD FOR VESSEL" (Korean Patent Application Publication No. 10-2018-0017568) discloses a hybrid power generation and propulsion system for a ship that may achieve zero pollutant emissions by way of receiving electric power supplied through a battery and driving a propellant in a sea area to which the environmental pollution regulations are applied.

However, since battery charging and discharging is performed without considering load factors of an operating generator, a service life of a battery is adversely affected through the careless charging and discharging, and since a battery control system and a generator control system interfere with each other, operating the generator is unstable and performing the economical operation is limited, and thus this is a time when new technology development is urgently required to solve such problems.

Documents of Related Art (Patent Document 1) Korean Patent Application Publication No. 10-2018-0017568, "HYBRID GENERATION AND PROPULSION SYSTEM AND METHOD FOR VESSEL"

SUMMARY OF THE INVENTION

The present disclosure is devised to solve the above-described problems, and an objective of the present disclosure for solving the technical problems is to provide a load area tracking type ship battery management system that performs battery charging and discharging in consideration of load factors of a generator, so that careless charging and discharging of a battery may be prevented to prolong a service life of the battery, the generator may be operated with high energy efficiency by reducing fuel consumption, and the generator with required loads may be operated in a section where a fuel consumption rate is optimized.

In order to solve the above technical problems, the present disclosure provides a load area tracking type ship battery management system in a ship battery management system composed of a power management system PMS configured to control electric power of a plurality of generators C1, C2, C3, and C4 in a ship, a battery management system (BMS) configured to measure a state of charge (SOC), which is a charge amount of a battery in the ship, and an energy management System (EMS) configured to link and control the PMS, the BMS, and loads of the ship, the load area tracking type ship battery management system including: a calculation unit configured to generate SFOC curve data periodically by calculating specific fuel oil consumption (SFOC, i.e., fuel consumption per unit output of the ship [g/kwh]) versus ship load factors represented by a combination of the present generators by the EMS; a LF setting unit configured to specify a ship load factor point, at which one of the plurality of generators is allowed to be stopped, as a light load factor (LF) point in the SFOC curve data; a HF setting unit configured to specify a ship load factor point, at which one of the plurality of generators should be additionally operated, as a heavy load factor (HF) point; a Emax setting unit configured to obtain a highest point Emax of generator efficiency; a Rmin setting unit configured to calculate battery charging efficiency in the LF to obtain a smallest load factor point Rmin bearing a generator load by battery charging; and a Rmax setting unit configured to calculate battery charging efficiency in the HF to obtain a highest load factor point Rmax bearing the generator load by battery discharging, wherein each ship load factor is tracked according to the combination of the plurality of generators, the EMS increases the loads through the battery charging when a generator load factor is less than the Rmin, so as to return the generator load factor to be greater than or equal to the Rmin, and determines the state as an overload state to compensate for an overload amount by the battery discharging when a generator load factor is greater than the Rmax, so as to return the generator load factor to be less than or equal to the Rmax, thereby allowing each generator of the ship to operate in the Rmin to Rmax range, which is a section where a fuel consumption rate of the ship is optimized.

In the present disclosure, the LF setting unit may specify the light load factor (LF) point by Equation 1 below.

$$\text{if, } \sum_{n=1}^{k} R_n = 1, LF = NAN \quad \text{[Equation 1]}$$

$$\text{else if, } \sum_{n=3}^{4} R_n > 1,$$

-continued $$LF = \frac{(PMS_{LF} \times (C_n \times R_n) - C_3)}{\sum_{n=1}^{4} C_n \times R_n} \times 100$$

$$\text{else, } LF = \frac{PMS_{LF} \times \left(\sum_{n=1}^{4}(C_n \times R_n) - C_1\right)}{\sum_{n=1}^{4}(C_n \times R_n)} \times 100$$

$R_n$: whether n-th generator is running (1: run, 0: stop)
LF: conversion result of light load factor [%]
$PMS_{LF}$: based on PMS, light load factor [%] depending on the number of generators currently in operation (i.e., an arbitrary set value), load factor after one generator stops
$C_n$: capacity of n-th generator [kWh]

In the present disclosure, the HF setting unit may specify the heavy load factor (HF) point by Equation 2 below.

$$HF = PMS_{HF} \qquad \text{[Equation 2]}$$

$PMS_{HF}$: based on PMS, heavy load factor [%] depending on the number of generators currently in operation (i.e., the arbitrary set value)
HF: heavy load factor [%]

In the present disclosure, the Emax setting unit may specify the highest point Emax of the generator efficiency by Equation 3 below.

$$CF = \{CF_0, CF_1, CF_2, \ldots, CF_{100}\}$$

$$E_{max} = \min CF$$

$$\text{if, } E_{max} = HF; E_{max} = HF - q \qquad \text{[Equation 3]}$$

CF: set of fuel consumption [g/kWh] depending on load factor in combination of present generators
$CF_n$: fuel consumption [g/kWh] at load factor n [%] in combination of present generators
q: arbitrarily set margin In the present disclosure, the Rmin setting unit may specify the smallest load factor point Rmin by Equation 4 below.

$$CF = \{CF_0, CF_1, CF_2, \ldots, CF_{100}\} \qquad \text{[Equation 4]}$$

$$\text{Range}_n^e = \left\{ \chi \mid \chi \in CF, (\max CF - \min CF) \times \frac{BE}{100} + \min CF < CF_n \right\}$$

$$R_{min} = \min \text{Range}_n^e$$

$$\text{if, } R_{min} < LF; R_{min} = LF$$

CF: set of fuel consumption [g/kWh] depending on load factors in combination of present generators
$CF_n$: fuel consumption [g/kWh] at load factor n [%] in combination of present generators
$\text{Range}_n^e$: efficient range [%] compared to battery power conversion efficiency at load factor n [%]
BE: battery conversion efficiency [%]
$R_{min}$: smallest load factor at $\text{Range}_n^e$ In the present disclosure, the Rmax setting unit may specify the highest load factor point Rmax by using Equation 5 below.

$$CF = \{CF_0, CF_1, CF_2, \ldots, CF_{100}\} \qquad \text{[Equation 5]}$$

$$\text{Range}_n^e = \left\{ \chi \mid \chi \in CF, (\max CF - \min CF) \times \frac{BE}{100} + \min CF < CF_n \right\}$$

$$R_{max} = \max \text{Range}_n^e$$

$$\text{if, } R_{max} < HF; R_{max} = HF - p$$

CF: set of fuel consumption [g/kWh] depending on load factor in combination of present generators
$CF_n$: fuel consumption [g/kWh] at load factor n [%] in combination of present generators
$\text{Range}_n^e$: efficient range [%] compared to battery power conversion efficiency at load factor n [%]
BE: battery conversion efficiency [%]
$R_{max}$: largest load factor in $\text{Range}_n^e$
p: arbitrarily set margin (however, a value smaller than q of Equation 3)

In the present disclosure, the load area tracking type ship battery management system may derive battery improvement efficiency N depending on load factors, derive improvement efficiency N1 by Equation 6 when the battery is charged, and derive improvement efficiency N2 by Equation 7 when the battery is discharged.

$$N1 = \frac{f(LF_1) - f(LF_2)}{f(0) - f(E_{max})} \times 100[\%] \qquad \text{[Equation 6]}$$

N1: instantaneous efficiency improvement result [%]
LF1: load factor before change [%]
LF2: load factor [%] after change due to battery charging $$N2 = \frac{f(HF_1) - f(HF_2)}{f(0) - f(E_{max})} \times 100[\%] \qquad \text{[Equation 7]}$$

N2: instantaneous efficiency improvement result [%]
HF1: load factor before change [%]
HF2: load factor [%] after change due to battery discharging In the present disclosure, the load area tracking type ship battery management system may specify a load variation zone range on the basis of a predetermined range of load factors versus time variably changed in real time.

In the present disclosure, the load area tracking type ship battery management system may derive battery improvement efficiency M according to the load variation zone range, derive improvement efficiency M1 by Equation 8 when the battery is charged, and derive improvement efficiency M2 by Equation 9 when the battery is discharged.

$$M1 = \frac{(C - B) - (C - A)}{C - D} \times 100[\%] \qquad \text{[Equation 8]}$$

A: load range after battery charging
B: load range before battery charging
C: load range at largest efficiency
D: load range at lowest efficiency $$M2 = \frac{(C - B') - (C - A')}{C - D} \times 100[\%] \qquad \text{[Equation 9]}$$

A': load range after battery discharging

B: load range before battery discharging

C: load range at largest efficiency

D: load range at lowest efficiency

In the present disclosure, the load area tracking type ship battery management system may be configured to further include a battery control unit, and the battery control unit may be configured to include: a battery state determination unit configured to determine a discharging state, a standby state, and a charging state among battery states; a first battery transition determination unit configured to determine whether to transit to the standby state or maintain the discharging state when the battery is in the discharging state due to the battery state determination unit; a second battery transition determination unit configured to determine whether to transit to the standby state or maintain the charging state when the battery is in the charging state due to the battery state determination unit; and a third battery transition determination unit configured to determine whether to transit to the discharging state or the charging state, or maintain the standby state, according to the load variation zone range, when the battery is in the standby state due to the battery state determination unit, thereby performing a battery operation.

According to the load area tracking type ship battery management system by the solution for solving the above problems, there are effects in that the load area tracking type ship battery management system is configured to perform the battery charging and discharging in consideration of the load factors of the generator, the careless charging and discharging of the battery may be prevented to prolong the service life of the battery, the generator may be operated with high energy efficiency by reducing fuel consumption, and the generator with the required loads may be operated in a section where a fuel consumption rate is optimized.

DETAILED DESCRIPTION OF THE INVENTION

An embodiment of the present disclosure will be described below with reference to the drawings, and in the following description of the embodiment of the present disclosure, detailed descriptions of known functions and components incorporated herein will be omitted when it may make the subject matter of the embodiment of the present disclosure unclear.

In addition, since terms to be described later are terms defined in consideration of functions in the embodiment of the present disclosure, which may vary according to the intentions or practices of users or operators, the definition of the terms should be made based on the contents throughout the present specification describing the embodiment of the present disclosure.

Figure 1:
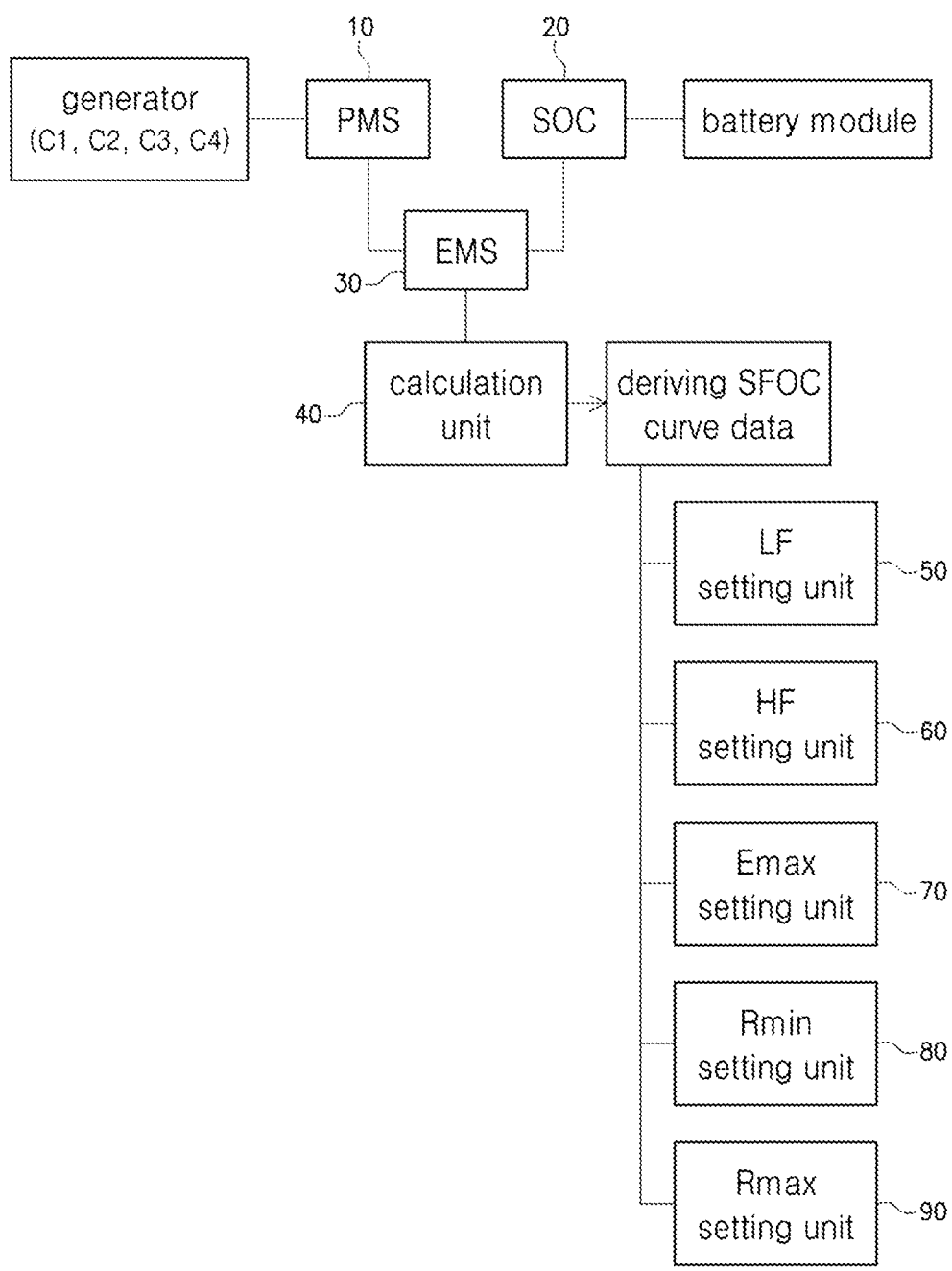
FIG. 1 is a configuration diagram illustrating a configuration implementing a load area tracking type ship battery management system of the present disclosure.

Hereinafter, a configuration of the present disclosure is described with reference to the accompanying drawings. As shown in FIG. 1, the background art is a ship battery management system configured to include: a power management system (PMS) 10 for controlling power of a plurality of generators C1, C2, C3, and C4 in a ship; a battery management system (BMS) 20 for measuring a state of charge (SOC), which is a charge amount of a battery in the ship; and an energy management system (EMS) 30 for linking and controlling the PMS 10, the BMS 20, and loads of the ship.

The power management system (PMS) 10 is a system control unit configured to control driving of the plurality of generators installed in the ship, and realizes automatic load distribution and optimizes efficiency of each generator.

The battery management system (BMS) 20 measures a state of charge (SOC), which is the charge amount of the battery in the ship. Here, the state of charge (SOC) is a scale that may display a fuel amount of a storage battery used in the battery, and indicates that the storage battery is full when a remaining capacity is 100%, and indicates a state in which the storage battery is fully exhausted when the remaining capacity is 0%.

The energy management system (EMS) 30 is a system that manages and supports the status of supply and usage of energy used in facilities, equipment, and processes in the ship, and monitors or controls power system facilities while simultaneously managing the energy of each individual load.

A conventional ship having the background art has various load characteristics depending on operation modes. The loads are composed of a propulsion load that changes depending on speeds of a ship, a continuous load that is fundamental for ship operation, an intermittent load that changes depending on situations, a deck load that is for loading or unloading, etc. Accordingly, electric power, for which a power generator should be responsible, changes continuously.

In consideration of load factors of a generator when battery charging and discharging is performed, the present disclosure may decrease a high load factor of the generator by supplying power through the battery discharging, or may increase a low load factor of the generator through the battery charging.

Accordingly, the load area tracking type ship battery management system according to the present disclosure is configured to further include a calculation unit 40, and on the basis of SFOC curve data derived from the calculation unit 40, is configured to further include a LF setting unit 50, a HF setting unit 60, an Emax setting unit 70, a Rmin setting unit 80, and a Rmax setting unit 90.

Figure 2:
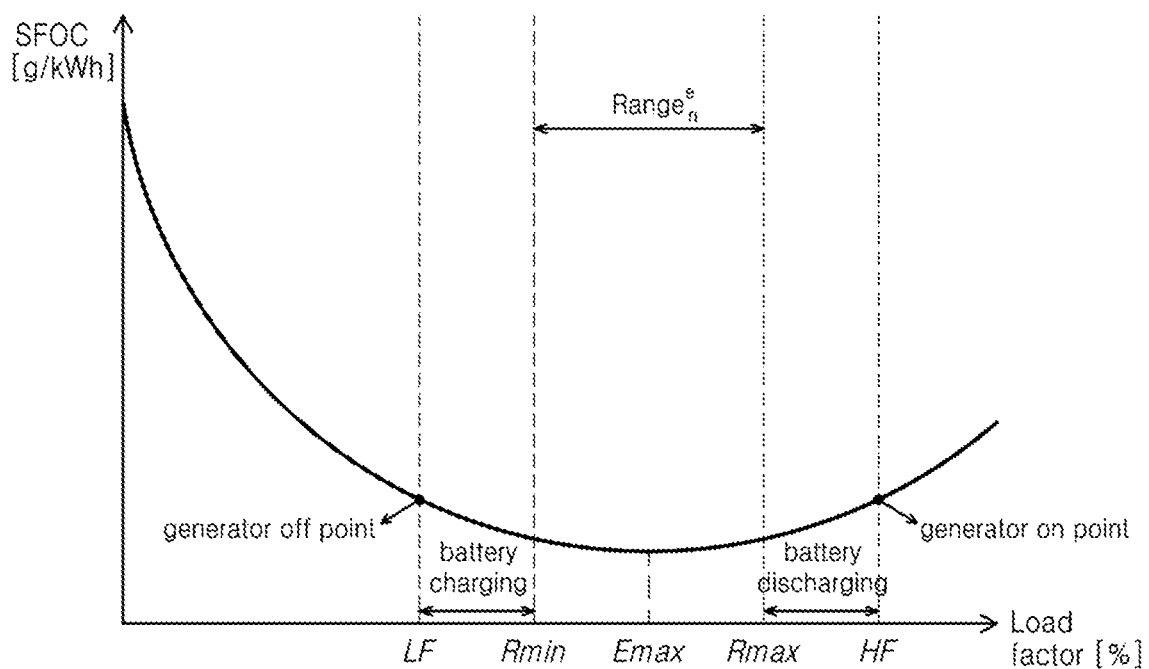
FIG. 2 is an explanatory view illustrating an operation of an embodiment of the present disclosure in SFOC curve data.

As shown in FIG. 2, by calculating specific fuel oil consumption (SFOC, i.e., fuel consumption per unit power of ship [g/kwh]) versus ship load factors represented by a combination of present generators by the EMS 30, the calculation unit 40 may calculate SFOC curve data periodically. Here, SFOC is the fuel consumption per unit power, representing that the smaller the number, the less the amount of fuel consumed to generate a constant power. The SFOC generally shows the highest efficiency at a generator load factor of 80 to 85%.

In SFOC curve data derived by the calculation unit 40, the LF setting unit 50 specifies a ship load factor point, at which one of the plurality of generators is allowed to be stopped, as a light load factor (LF) point. Here, the LF setting unit specifies the light load factor (LF) point according to Equation 1 below.

According to Equation 1, when there is one generator being driven first, there is no generator that may be shut down, so a LF is not specified.

However, when two small-capacity generators are being driven, a LF should be specified on an assumption that one small-capacity generator has been shut down. In this case, in ship's generators, smaller capacity generators are usually shut down first. $PMS_{LF}$ is a value that is set by the PMS 10 depending on the number of generators in use.

Alternatively, in an assumption that one large-capacity generator has been shut down, a LF should be specified.

Here, according to the exemplary embodiment of the present disclosure, $C_1$ and $C_2$ represent respective large-capacity generators, and $C_3$ and $C_4$ represent respective small-capacity generators.

[Equation 1]

$$\text{if, } \sum_{n=1}^{k} R_n = 1, LF = NAN$$

$$\text{elseif, } \sum_{n=3}^{4} R_n > 1, LF = \frac{(PMS_{LF} \times (C_n \times R_n)) - C_3}{\sum_{n=1}^{4} C_n \times R_n} \times 100$$

$$\text{else, } LF = \frac{PMS_{LF} \times \left(\sum_{n=1}^{4}(C_n \times R_n) - C_1\right)}{\sum_{n=1}^{4}(C_n \times R_n)} \times 100$$

$R_n$: whether n-th generator is running (1: run, 0: stop)
LF: conversion result of light load factor [%]
$PMS_{LF}$: based on PMS, light load factor [%] depending on the number of generators currently in operation (i.e., an arbitrary set value of PMS), load factor after one generator stops
$C_n$: capacity of n-th generator [kWh]

The HF setting unit 60 specifies a ship load factor point, at which one of the plurality of generators should be additionally operated, as a heavy load factor (HF) point. Here, the HF setting unit 60 specifies the heavy load factor (HF) point by the following Equation 2, and receives $PMS_{HF}$ (i.e., the arbitrary set value depending on the number of generators currently in operation) from the PMS 10 to specify the HF.

$$HF = PMS_{HF} \quad \text{[Equation 2]}$$

$PMS_{HF}$: based on PMS, heavy load factor [%] depending on the number of generators currently in operation (i.e., the arbitrary set value of the PMS)
HF: heavy load factor [%]

The Emax setting unit 70 is to obtain a highest point Emax of generator efficiency. The Emax setting unit 70 specifies the highest point Emax of the generator efficiency by using Equation 3 below.

According to Equation 3, a lowest point of the fuel consumption refers to the highest point of the generator efficiency in a set of fuel consumption depending on load factors in a combination of present generators.

When a load factor of the highest point Emax of the generator efficiency is greater than a load factor of a HF point derived by Equation 2, an arbitrary setting margin q is specified to lead the load factor of the highest point Emax of the generator efficiency to have a value smaller than a value of the load factor of the HF point.

$$CF = \{CF_0, CF_1, CF_2, \ldots, CF_{100}\}$$

$$E_{max} = \min CF$$

$$\text{if, } E_{max} < HF; E_{max} = HF - q \quad \text{[Equation 3]}$$

CF: set of fuel consumption [g/kWh] depending on load factor in combination of present generators
$CF_n$: fuel consumption [g/kWh] at load factor n [%] in combination of present generators
q: arbitrarily set margin The Rmin setting unit 80 is to calculate battery charging efficiency in the LF to obtain a smallest load factor point Rmin that bears a generator load by battery charging, and the smallest load factor point Rmin may be specified by using Equation 4 below.

According to Equation 4, in order to derive $Range_n^e$ (i.e., an effective range compared to battery power conversion efficiency depending on load factors) from the SFOC curve data, a set CF for fuel consumption is prepared for each load factor, and elements of $Range_n^e$ is composed of elements of the set CF. $Range_n^e$ represents an extent of elements of the CF having efficiency corresponding to battery loss in CF (minCF) of largest efficiency, and a highest $CF_n$ or n (load factor) is identified among the elements of the CF. In this case, a smallest value is derived from $CF_n$, and is set as the smallest load factor point Rmin.

However, when Rmin is less than a load factor LF, Rmin may be specified as an LF value.

In this case, BE in $Range_n^e$ represents battery conversion efficiency in consideration of power loss due to the efficiency of a power converter and a battery, and in general, 4% to 5.5% may be derived.

$$CF = \{CF_0, CF_1, CF_2, \ldots, CF_{100}\} \quad \text{[Equation 4]}$$

$$Range_n^e = \left\{ x \mid x \in CF, (\max CF - \min CF) \times \frac{BE}{100} + \min CF < CF_n \right\}$$

$$R_{min} = \min Range_n^e$$

$$\text{if, } R_{min} < LF; R_{min} = LF$$

CF: set of fuel consumption [g/kWh] depending on load factors in combination of present generators $CF_n$: fuel consumption [g/kWh] at load factor n [%] in combination of present generators $Range_n^e$: efficient range [%] compared to battery power conversion efficiency at load factor n [%]

BE: battery conversion efficiency [%]

$R_{mim}$: smallest load factor at $Range_n^e$

The Rmax setting unit 90 is to calculate battery charging efficiency in a HF to obtain a highest load factor point Rmax that bears a generator load by battery discharging, and the highest load factor point Rmax may be specified by using Equation 5 below.

According to Equation 5, in order to derive $Range_n^e$ (i.e., an effective range compared to battery power conversion efficiency depending on load factors) from SFOC curve data, a set CF for fuel consumption is prepared for each load factor, and elements of $Range_n^e$ is composed of elements of the set CF. $Range_n^e$ represents an extent of elements of the CF having an efficiency corresponding to battery loss in CF (minCF) of largest efficiency, and a highest $CF_n$ or n (load factor) is identified among the elements of the CF. In this case, a largest value within the effective range is set as the highest load factor point Rmax.

However, when Rmax is greater than a load factor HF, the Rmax may be specified as a value of HF−p, where p is an arbitrarily set margin. However, p should be a value smaller than q of Equation 3.

In this case, BE in $Range_n^e$ is to represent the battery conversion efficiency in consideration of the power loss due to the efficiency of the power converter and the battery, and in general, 4% to 5.5% may be derived.

$$CF = \{CF_0, CF_1, CF_2, \ldots, CF_{100}\} \quad \text{[Equation 5]}$$

$$Range_n^e = \left\{ x \middle| x \in CF, (\max CF - \min CF) \times \frac{BE}{100} + \min CF < CF_n \right\}$$

$$R_{max} = \max Range_n^e$$

$$\text{if, } R_{max} < HF; R_{max} = HF - p$$

CF: set of fuel consumption [g/kWh] depending on load factor in combination of present generators $CF_n$: fuel consumption [g/kWh] at load factor n [%] in combination of present generators $Range_n^e$: efficient range [%] compared to battery power conversion efficiency at load factor n [%]

BE: battery conversion efficiency [%]

$R_{max}$: largest load factor in $Range_n^e$ p: arbitrarily set margin (however, a value smaller than q of Equation 3)

In the present disclosure configured as described above, referring to FIG. 2, the EMS 30 stops one of the plurality of generators at a LF point, and additionally operates one of the plurality of generators at a HF point. In addition, when a generator load factor is less than Rmin, a load is increased by battery charging, so as to return the generator load factor to Rmin or higher, and when the generator load factor is greater than Rmin, a generator is determined to be overloaded and an amount of the overload is compensated for by battery discharging, whereby the generator of a ship may be operated in a range from Rmin to Rmax, which is a section where a fuel consumption rate of the ship is optimized.

Figure 3:
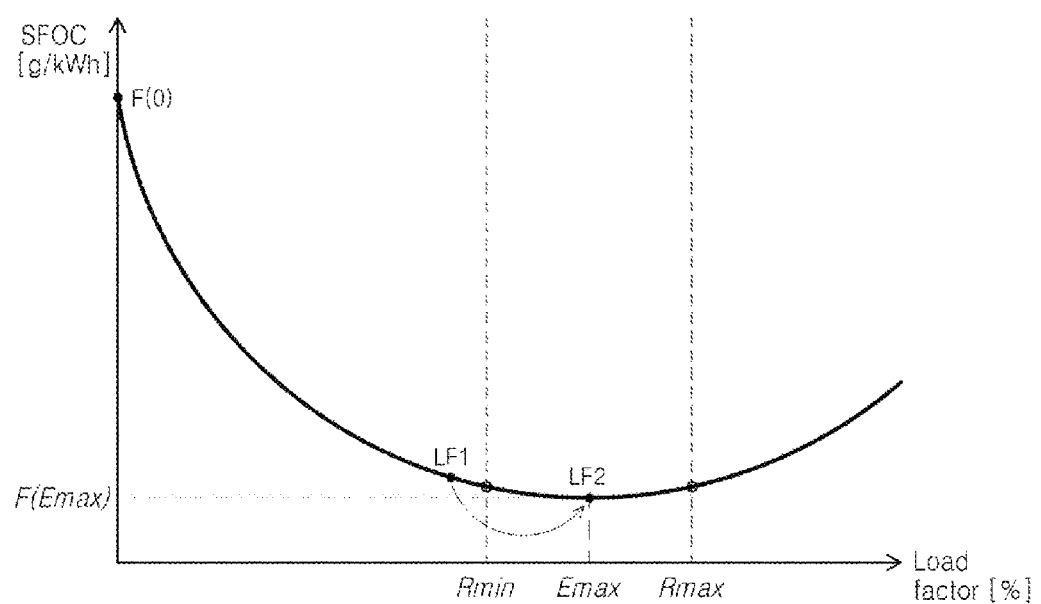
FIG. 3 is a graph illustrating derivation of improvement efficiency N1 when a battery is charged depending on load factors of the present disclosure.
Figure 4:
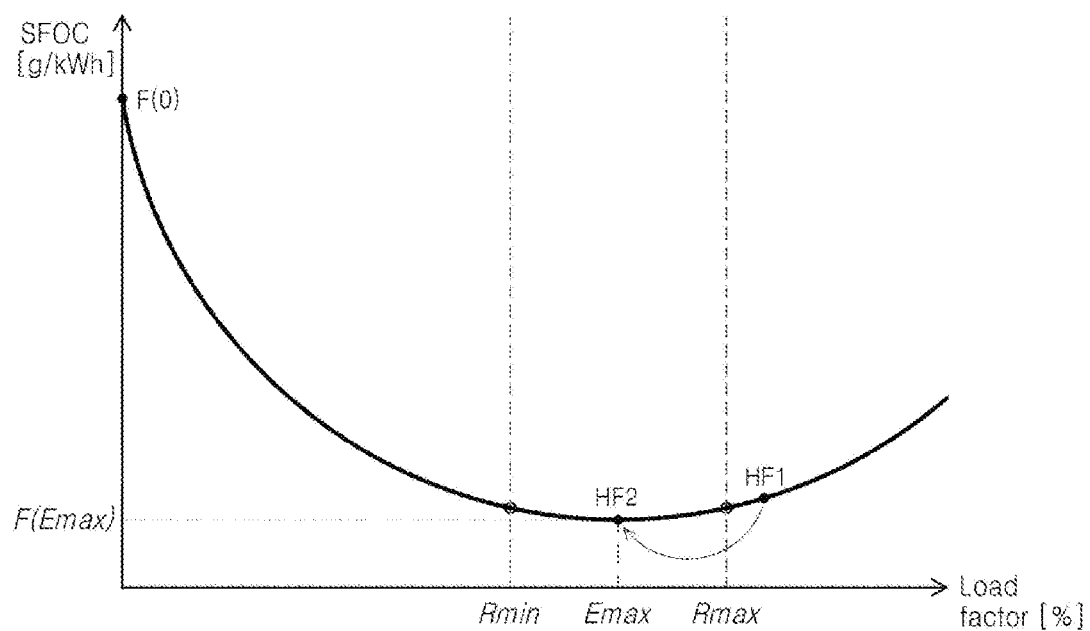
FIG. 4 is a graph illustrating derivation of improvement efficiency N2 when the battery is discharged depending on the load factors of the present disclosure.

In addition, the load area tracking type ship battery management system of the present disclosure derives battery improvement efficiency N depending on load factors. As shown in FIG. 3, improvement efficiency N1 when a battery is charged may be derived by Equation 6, and as shown in FIG. 4, improvement efficiency N2 when the battery is discharged may be derived by Equation 7.

According to Equation 6, the improved efficiency N1 when the battery is charged may be derived from a load factor before the battery is charged and a load factor after the battery is charged.

$$N1 = \frac{f(LF_1) - f(LF_2)}{f(0) - f(E_{max})} \times 100[\%] \quad \text{[Equation 6]}$$

N1: instantaneous efficiency improvement result [%]

LF1: load factor before change [%]

LF2: load factor [%] after change due to battery charging

According to Equation 7, the improvement efficiency N2 when a battery is discharged may be derived from a load factor before the battery is discharged and a load factor after the battery is discharged.

$$N2 = \frac{f(HF_1) - f(HF_2)}{f(0) - f(E_{max})} \times 100[\%] \quad \text{[Equation 7]}$$

N2: instantaneous efficiency improvement result [%]

HF1: load factor before change [%]

HF2: load factor [%] after change due to battery discharging

Figure 5:
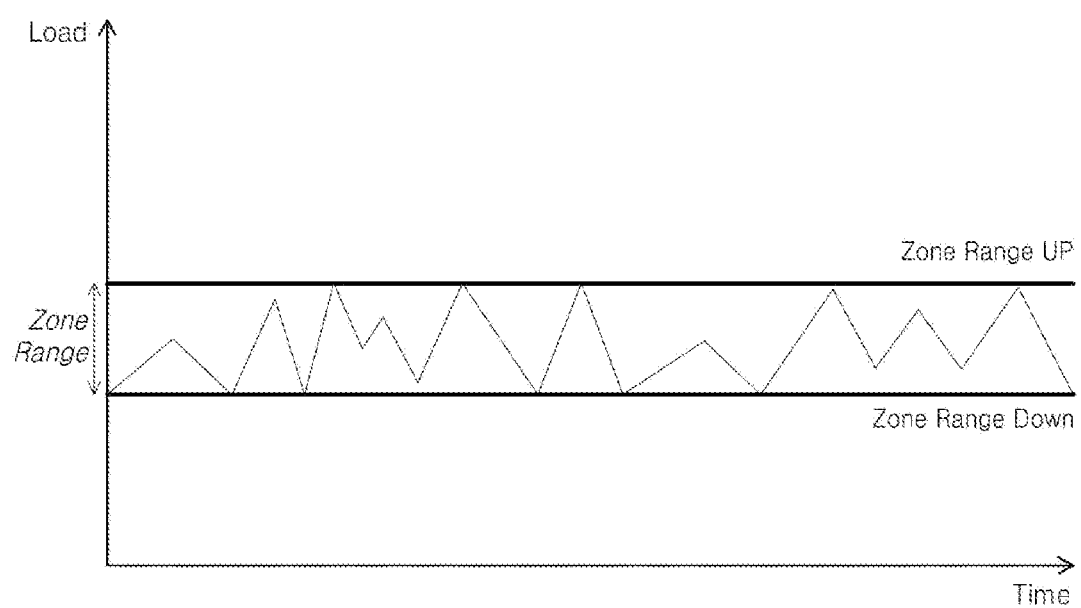
FIG. 5 is a graph illustrating a load variation zone range with respect to time versus load factor of the present disclosure.

Meanwhile, in FIG. 5, the load area tracking type ship battery management system according to the exemplary embodiment of the present disclosure may specify a load variation zone range on the basis of a predetermined range of load factors versus time variably changed in real time. Here, by setting the load variation zone range, system resources for performing an algorithm in a ship battery system may be consumed less.

Figure 6:
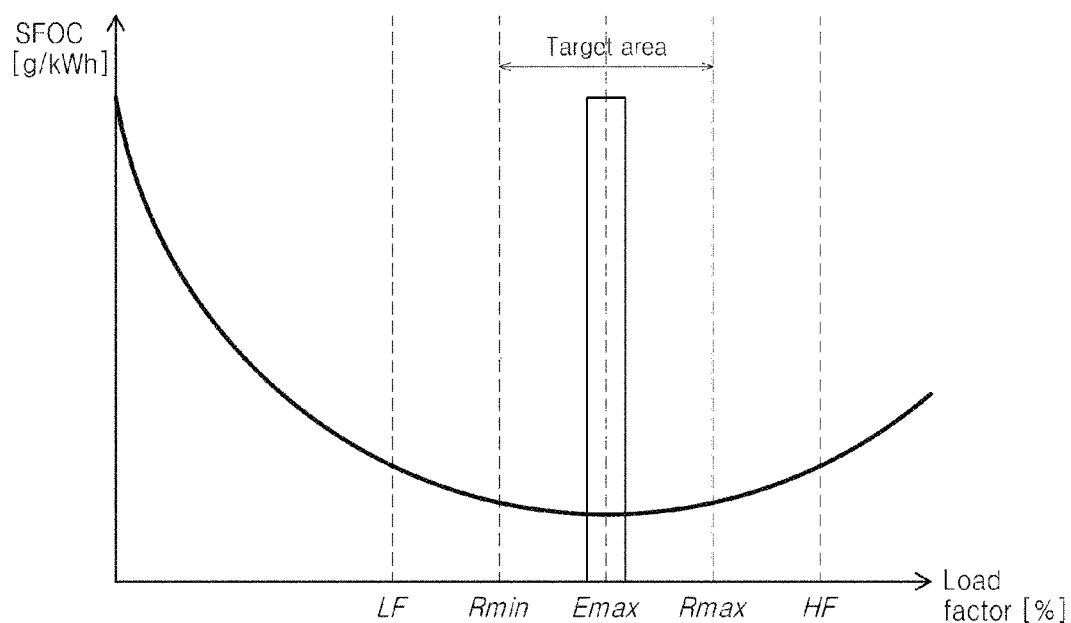
FIG. 6 is a graph to which the load variation zone range of the present disclosure is applied.

FIG. 6 is a view exemplarily illustrating a load variation zone range according to the exemplary embodiment of the present disclosure. When a largest value of a load variation zone range (i.e., a value of Zone Range Up) is greater than a value of a HF point, one of the plurality of generators is additionally operated, and when a lowest value of the load variation zone range (i.e., a value of Zone Range Down) is less than a value of a LF point, an operation of one of the plurality of generators is stopped. In addition, when a load factor of a generator is less than Rmin, a load is increased by battery charging, so as to return the load factor of the generator to Rmin or higher, and when a load factor is greater than Rmin, the generator is determined to be overloaded and an amount of the overload is compensated for by battery discharging, whereby the generator of a ship may be operated in a range from Rmin to Rmax, which is a section where a fuel consumption rate of the ship is optimized.

Figure 7:
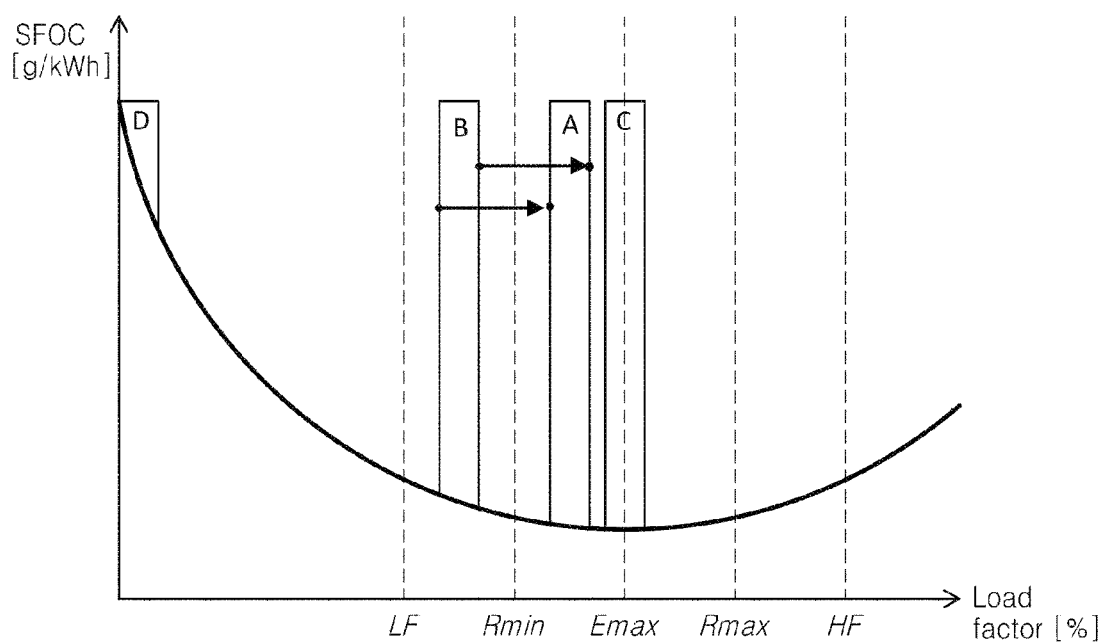
FIG. 7 is a graph illustrating derivation of battery improvement efficiency M1 when the battery is charged according to the load variation zone range in the present disclosure.
Figure 8:
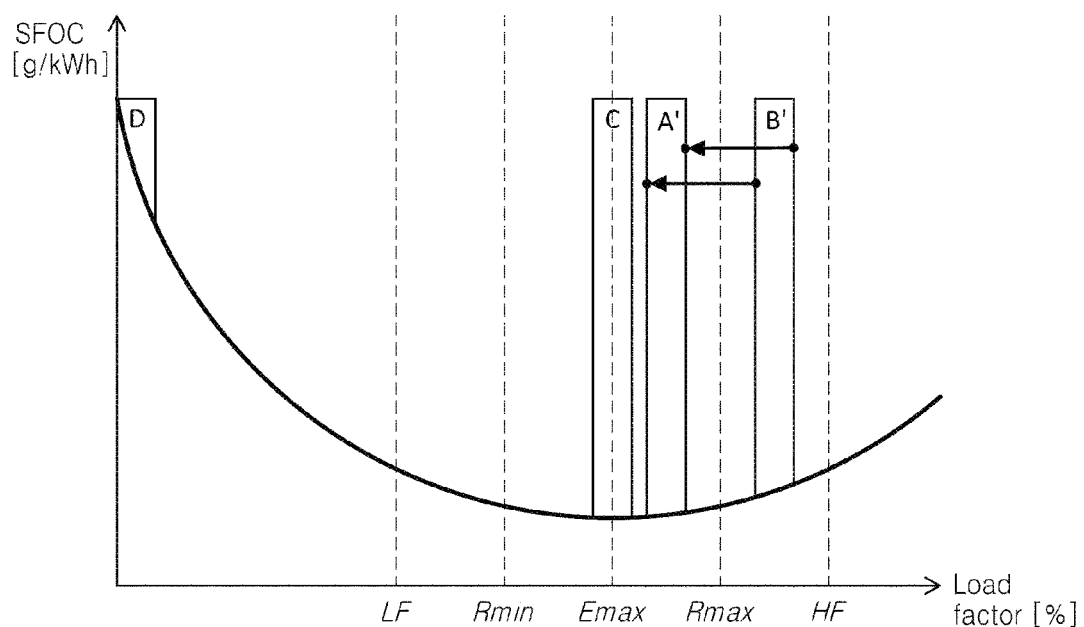
FIG. 8 is a graph illustrating derivation of battery improvement efficiency M2 when the battery is discharged according to the load variation zone range in the present disclosure.

In this case, battery improvement efficiency M may be derived according to the load variation zone range. As shown in FIG. 7, improvement efficiency M1 when a battery is charged may be derived by Equation 8, and as shown in FIG. 8, improvement efficiency M2 when the battery is discharged may be derived by Equation 9.

According to Equation 8, the improvement efficiency M1 when the battery is charged may be obtained with a load variation zone range before the battery is charged and a load variation zone range after the battery is charged.

$$M1 = \frac{(C-B)-(C-A)}{C-D} \times 100[\%] \qquad \text{[Equation 8]}$$

A: load range after battery charging
B: load range before battery charging
C: load range at largest efficiency
D: load range at lowest efficiency According to Equation 9, the improvement efficiency M2 when a battery is discharged may be obtained with a load variation zone range before the battery is discharged and a load variation zone range after the battery is discharged.

$$M2 = \frac{(C-B')-(C-A')}{C-D} \times 100[\%] \qquad \text{[Equation 9]}$$

A': load range after battery discharging
B': load range before battery discharging
C: load range at largest efficiency
D: load range at lowest efficiency Meanwhile, states of a battery is divided into a standby state, a charging state, and a discharging state, and a battery operation may be performed according to each specified point in SFOC curve data.

Figure 9:
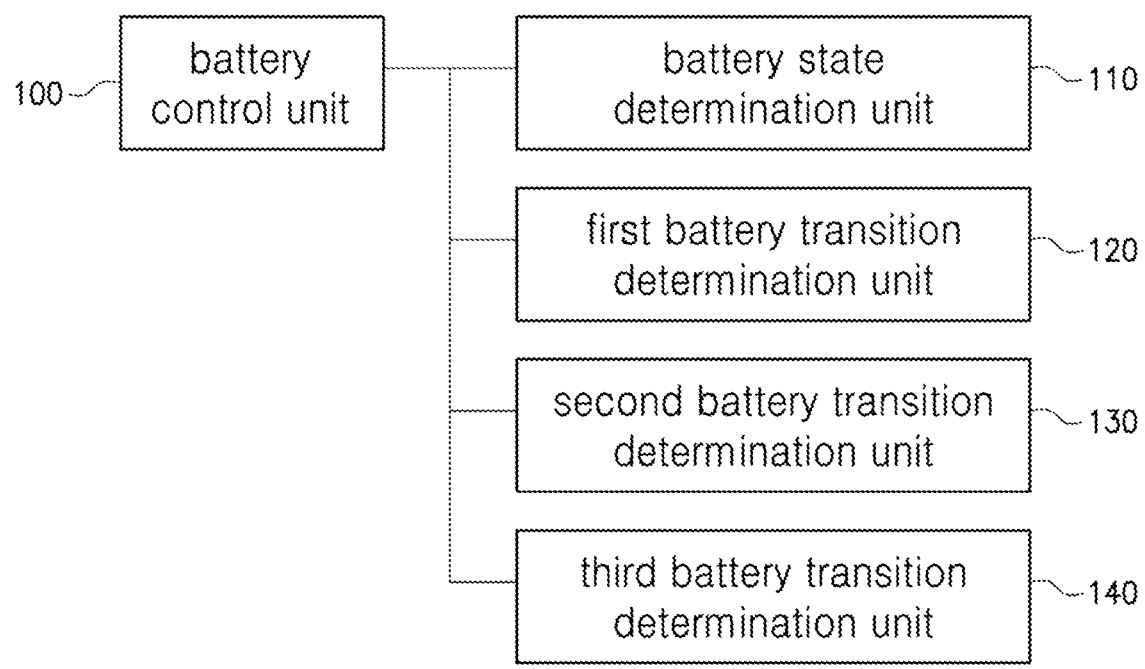
FIG. 9 is a block diagram illustrating a configuration of a battery control unit of the present disclosure.
Figure 10:
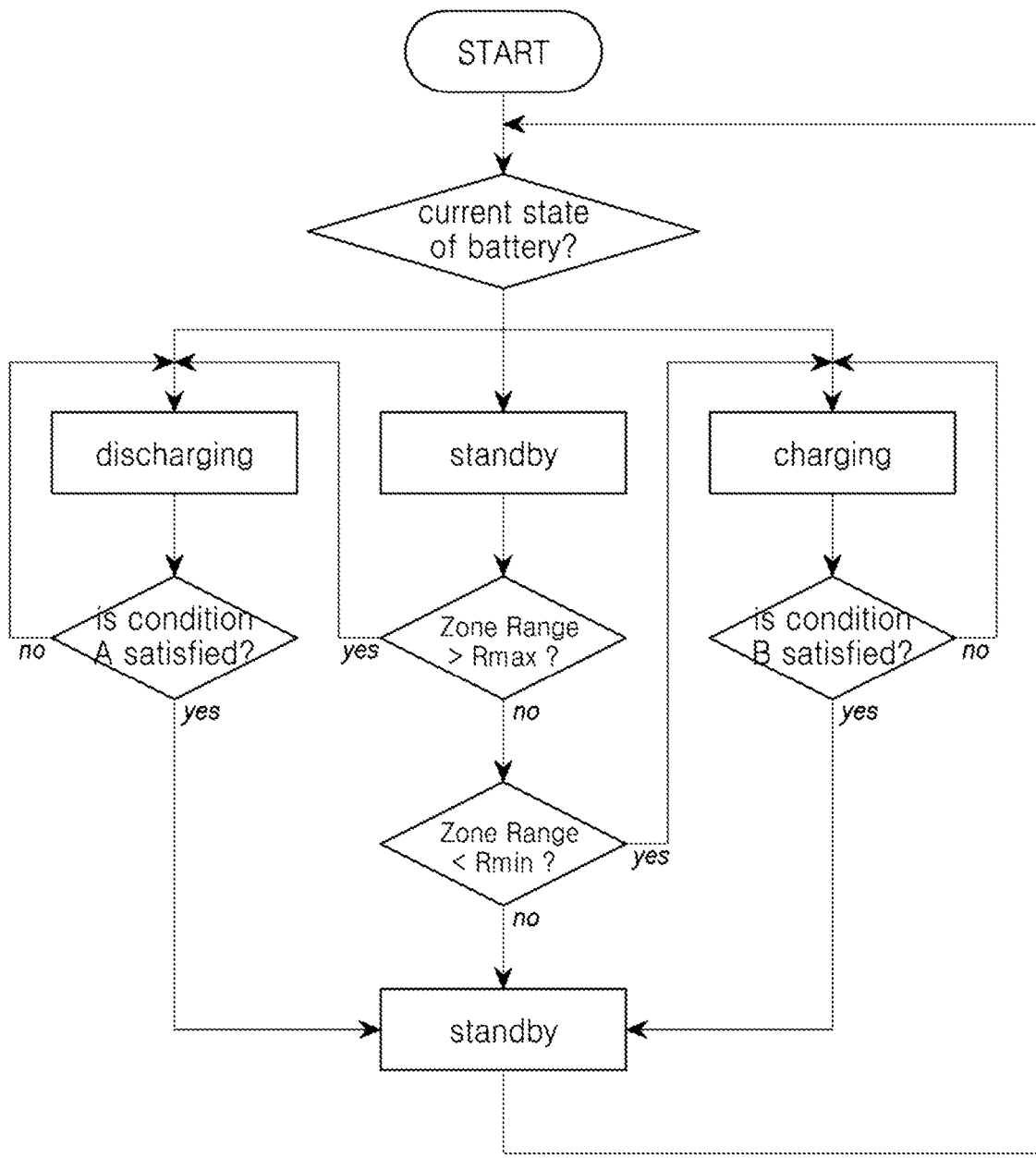
FIG. 10 is a flowchart schematically illustrating FIG. 9.

Hereinafter, a description will be given with reference to FIGS. 9 to 10.

However, a set SOC value to be described later is a value that may be changed to an arbitrary value, and within a load variation zone range, a largest value of the load variation zone range is a value of Zone Range Up and a smallest value of the load variation zone range is a value of Zone Range Down.

The load area tracking type ship battery management system may be configured to further include a battery control unit 100, and the battery control unit 100 may be configured to include a battery state determination unit 110, a first battery transition determination unit 120, a second battery transition determination unit 130, and a third battery transition determination unit 140.

The battery state determination unit 110 determines a current battery state among the battery states of discharging, standby, and charging.

The first battery transition determination unit 120 determines whether a battery is transited to a standby state or maintained in a discharging state when the current battery is in the discharging state due to the battery state determination unit 110.

Transition conditions of the first battery transition determination unit 120 is as follows, and is specified as conditions A in FIG. 10.

Given conditions that a SOC value is less than or equal to 35% (i.e., a set SOC value), a Zone Range Up is less than Rmax when assuming transition to a battery standby state, or a battery discharging rate (i.e., a c-rate) is zero, a battery is transited to a standby state when at least one or more of the conditions are satisfied and the battery is maintained in a discharging state when at least one or more of the conditions are not satisfied.

The second battery transition determination unit 130 determines whether the battery is transited to the standby state or maintained in the charging state when the current battery is in a charging state due to the battery state determination unit 110.

Transition conditions of the second battery transition determining unit 130 is as follows, and is specified as conditions B in FIG. 10.

Given conditions that a SOC value is less than or equal to 95% (i.e., a set SOC value), a Zone Range Down is less than Rmin when assuming transition to a battery standby state, or a Zone Range Up is greater than Rmax when assuming maintaining to a battery charging state, a battery is transited to the standby state when at least one or more of the conditions are satisfied and the battery is maintained in the charging state when at least one or more of the conditions are not satisfied.

When a current battery is in a standby state due to the battery state determination unit 110, the third battery transition determination unit 140 determines whether the battery is transited to a discharging state or charging state, or is maintained in the standby state according to a load variation zone range.

Transition conditions of the third battery transition determining unit 140 is as follows.

First, when a load variation zone range is greater than a Rmax value, a battery is transited to a discharging state. Otherwise, given conditions that a SOC value is greater than 40% (i.e., a set SOC value), a Zone Range Up is less than a HF when assuming transition to the battery discharging state, battery efficiency is greater than current battery efficiency when assuming transition to the battery discharging state, and a discharging rate is not zero, a battery is transited to the discharging state when the conditions are satisfied and the battery is determined to maintain a standby state when the conditions are not satisfied.

Alternately, when the load variation zone range is greater than a LF value and less than Rmin, the battery is transited to a charging state. Otherwise, given conditions that a SOC value is less than 90% (i.e., a set SOC value), a Zone Range Up is less than Rmax when assuming transition to the battery charging state, and battery efficiency is greater than current battery efficiency when assuming transition to the battery charging state, a battery is transited to the charging state when the conditions are satisfied and the battery is determined to maintain a standby state when the conditions are not satisfied.

In addition, when the load variation zone range is smaller than a LF value, the battery is transited to the charging state. Otherwise, given conditions that a SOC value is greater than 90% (i.e., a set SOC value), one generator is running, a Zone Range Up is less than Rmax when assuming transition to the battery charging state, and the battery efficiency is greater than the current battery efficiency when assuming transition to the battery charging state, the battery is transited to the charging state when the conditions are satisfied and the battery is determined to maintain a standby state when the conditions are not satisfied.

The load area tracking type ship battery management system configured as described above performs the battery charging and discharging in consideration of the generator load factors, the service life of the battery may be prolonged through preventing the careless charging and discharging of the battery from occurring, the fuel consumption may be reduced to enable the high-energy-efficiency operation, and the generator with the required loads may be operated in the section where the fuel consumption rate is optimized.

As such, the drawings shown above for the description of the present disclosure are one exemplary embodiment in which the present disclosure is realized, and as shown in the drawings, it may be seen that various types of combinations are possible in order to realize the subject matter of the present disclosure.

Therefore, the embodiment of the present disclosure is not limited to the above-described exemplary embodiments, and as claimed in the following claims, it will be said that there is a technical spirit of the present disclosure to the extent in which various changes can be implemented by anyone of those skilled in the art to which the present disclosure belongs without departing from the gist of the present disclosure.

What is claimed is:

1. A load area tracking type ship battery management system in a ship battery management system composed of a power management system (PMS) configured to control electric power of a plurality of generators (C1, C2, C3, and C4) in a ship, a battery management system (BMS) configured to measure a state of charge (SOC), which is a charge amount of a battery in the ship, and an energy management System (EMS) configured to link and control the PMS, the BMS, and loads of the ship, the load area tracking type ship battery management system comprising:
  a calculation unit configured to generate SFOC curve data periodically by calculating specific fuel oil consumption (SFOC, i.e., fuel consumption per unit output of the ship [g/kwh]) versus ship load factors represented by a combination of the present generators by the EMS;
  a LF setting unit configured to specify a ship load factor point, at which one of the plurality of generators is allowed to be stopped, as a light load factor (LF) point in the SFOC curve data;
  a HF setting unit configured to specify a ship load factor point, at which one of the plurality of generators should be additionally operated, as a heavy load factor (HF) point;
  a Emax setting unit configured to obtain a highest point (Emax) of generator efficiency;
  a Rmin setting unit configured to calculate battery charging efficiency in the LF to obtain a smallest load factor point (Rmin) bearing a generator load by battery charging; and
  a Rmax setting unit configured to calculate battery charging efficiency in the HF to obtain a highest load factor point (Rmax) bearing the generator load by battery discharging,
  wherein each ship load factor is tracked according to the combination of the plurality of generators,
  the EMS increases the loads through the battery charging when a generator load factor is less than the Rmin, so as to return the generator load factor to be greater than or equal to the Rmin, and determines the state as an overload state to compensate for an overload amount by the battery discharging when a generator load factor is greater than the Rmax, so as to return the generator load factor to be less than or equal to the Rmax, thereby allowing each generator of the ship to operate in a Rmin to Rmax range, which is a section where a fuel consumption rate of the ship is optimized,
  wherein the LF setting unit specifies the light load factor (LF) point by Equation 1 below $$\text{if, } \sum_{n=1}^{k} R_n = 1, LF = NAN \qquad \text{[Equation 1]}$$

$$\text{elseif, } \sum_{n=3}^{4} R_n > 1, LF = \frac{(PMS_{L,F} \times (C_n \times R_n)) - C_3}{\sum_{n=1}^{4} C_n \times R_n} \times 100$$

$$\text{else, } LF = \frac{PMS_{L,F} \times \left(\sum_{n=1}^{4}(C_n \times R_n) - C_1\right)}{\sum_{n=1}^{4}(C_n \times R_n)} \times 100$$

$R_n$: whether n-th generator is running (1: run, 0: stop)
LF: conversion result of light load factor [%]
$PMS_{L,F}$: based on PMS, light load factor [%] depending on the number of generators currently in operation (i.e., an arbitrary set value), load factor after one generator stops
$C_n$: capacity of n-th generator [kWh].

2. The load area tracking type ship battery management system of claim 1, wherein the HF setting unit specifies the heavy load factor (HF) point by Equation 2 below $$HF = PMS_{H,F} \qquad \text{[Equation 2]}$$

$PMS_{H,F}$: based on PMS, heavy load factor [%] depending on the number of generators currently in operation (i.e., the arbitrary set value)
HF: heavy load factor [%].

3. The load area tracking type ship battery management system of claim 1, wherein the Emax setting unit specifies the highest point (Emax) of the generator efficiency by Equation 3 below $$CF = \{CF0, CF1, CF2, \ldots, CF100\}$$

$$E_{max} = \min CF \qquad \text{[Equation 3]}$$

if, $E_{max} < HF$; $E_{max} = HF - q$

CF: set of fuel consumption [g/kWh] depending on load factor in combination of present generators
CFn: fuel consumption [g/kWh] at load factor n [%] in combination of present generators
q: arbitrarily set margin.

4. The load area tracking type ship battery management system of claim 1, wherein the Rmin setting unit specifies the smallest load factor point (Rmin) by Equation 4 below $$CF = \{CF0, CF1, CF2, \ldots, CF100\} \qquad \text{[Equation 4]}$$

$$Range_n^e = \left\{ \chi \middle| \chi \in CF, (\max CF - \min CF) \times \frac{BE}{100} + \min CF < CF_n \right\}$$

$$R_{min} = \min Range_n^e$$

if, $R_{min} < LF$; $R_{min} = LF$

CF: set of fuel consumption [g/kWh] depending on load factors in combination of present generators
CFn: fuel consumption [g/kWh] at load factor n [%] in combination of present generators
$Range_n^e$: efficient range [%] compared to battery power conversion efficiency at load factor n [%]
BE: battery conversion efficiency [%]
$R_{min}$: smallest load factor at $Range_n^e$.

5. The load area tracking type ship battery management system of claim 1, wherein the Rmax setting unit specifies the highest load factor point (Rmax) by using Equation 5 below $$CF = \{CF0, CF1, CF2, \ldots, CF100\} \quad \text{[Equation 5]}$$

$$Range_n^e = \left\{ \chi \,\middle|\, \chi \in CF, (\max CF - \min CF) \times \frac{BE}{100} + \min CF < CF_n \right\}$$

$$R_{max} = \max Range_n^e$$

if, $R_{max} < IIF$; $R_{max} = IIF - p$

CF: set of fuel consumption [g/kWh] depending on load factor in combination of present generators
CFn: fuel consumption [g/kWh] at load factor n [%] in combination of present generators
$Range_n^e$: efficient range [%] compared to battery power conversion efficiency at load factor n [%]
BE: battery conversion efficiency [%]
$R_{max}$: largest load factor in $Range_n^e$
p: arbitrarily set margin (however, a value smaller than q of Equation 3).

6. The load area tracking type ship battery management system of claim 1, wherein the load area tracking type ship battery management system derives battery improvement efficiency (N) depending on load factors, derives improvement efficiency (N1) by Equation 6 when the battery is charged, and derives improvement efficiency (N2) by Equation 7 when the battery is discharged $$N1 - \frac{f(LF_1) - f(LF_2)}{f(0) - f(E_{max})} \times 100[\%] \quad \text{[Equation 6]}$$

N1: instantaneous efficiency improvement result [%]
LF1: load factor before change [%]
LF2: load factor [%] after change due to battery charging $$N2 - \frac{f(HF_1) - f(HF_2)}{f(0) - f(E_{max})} \times 100[\%] \quad \text{[Equation 7]}$$

N2: instantaneous efficiency improvement result [%]
HF1: load factor before change [%]
HF2: load factor [%] after change due to battery discharging.

7. The load area tracking type ship battery management system of claim 1, wherein the load area tracking type ship battery management system specifies a load variation zone range on the basis of a predetermined range of load factors versus time variably changed in real time.

8. The load area tracking type ship battery management system of claim 7, wherein the load area tracking type ship battery management system derives battery improvement efficiency (M) according to the load variation zone range, derives improvement efficiency (M1) by Equation 8 when the battery is charged, and derives improvement efficiency (M2) by Equation 9 when the battery is discharged $$M1 - \frac{(C - B) - (C - A)}{C - D} \times 100[\%] \quad \text{[Equation 8]}$$

A: load range after battery charging
B: load range before battery charging
C: load range at largest efficiency
D: load range at lowest efficiency $$M2 = \frac{(C - B') - (C - A')}{C - D} \times 100[\%] \quad \text{[Equation 9]}$$

A': load range after battery discharging
B': load range before battery discharging
C: load range at largest efficiency
D: load range at lowest efficiency.

9. The load area tracking type ship battery management system of claim 7, wherein the load area tracking type ship battery management system is configured to further comprise a battery control unit, and
the battery control unit is configured to comprise:
a battery state determination unit configured to determine a discharging state, a standby state, and a charging state among battery states;
a first battery transition determination unit configured to determine whether to transit to the standby state or maintain the discharging state when the battery is in the discharging state due to the battery state determination unit;
a second battery transition determination unit configured to determine whether to transit to the standby state or maintain the charging state when the battery is in the charging state due to the battery state determination unit; and
a third battery transition determination unit configured to determine whether to transit to the discharging state or the charging state, or maintain the standby state, according to the load variation zone range, when the battery is in the standby state due to the battery state determination unit, thereby performing a battery operation.

* * * * *